United States Patent [19]

Taylor

[11] 4,416,774

[45] Nov. 22, 1983

[54] PARTICLE SEPARATING SCREEN UNIT FOR AGITATION TANK

[75] Inventor: Allan D. Taylor, Walnut Creek, Calif.

[73] Assignee: Bechtel International Corporation, San Francisco, Calif.

[21] Appl. No.: 348,535

[22] Filed: Feb. 12, 1982

[51] Int. Cl.³ .............................................. B01D 15/00
[52] U.S. Cl. ..................................... 210/236; 210/291
[58] Field of Search ................ 210/232, 234, 236–238, 210/289, 291, 266

[56] References Cited

U.S. PATENT DOCUMENTS 2,852,369  9/1958  Eyolfson .............................. 210/232
4,251,352  2/1981  Shoemaker ............................ 209/45

Primary Examiner—Ivars C. Cintins
Attorney, Agent, or Firm—John L. McGannon

[57] ABSTRACT

An agitation tank adapted to contain a slurried pulp or slurry containing particles, such as carbon particles, to be separated from the slurry. The tank has a screen unit removably mounted therein, the screen unit having a hollow body provided with an opening and a screen across the opening to allow the slurry to pass into the hollow body but to prevent the particles in the tank from passing into the hollow body. The slurry in the hollow body can then pass out of the screen unit and the tank through an outlet which communicates with the interior of the hollow body and an adjacent vessel. The screen unit can be removed from the tank to permit replacement of the screen surrounding the hollow body. The screen is removably mounted on the screen unit by a clamp to permit rapid change of the screen if the screen becomes defective. The agitation tank and its screen unit can be used to form a part of a carbon-in-pulp processing system in which a plurality of such tanks and screen units are used to separate metal and other values from a slurry by adsorption of the values on carbon particles in the tanks.

14 Claims, 7 Drawing Figures

PARTICLE SEPARATING SCREEN UNIT FOR AGITATION TANK

This invention relates to improvements in the use of an agitation tank of the type having a slurry containing particle material therein in which at least some of the particle material is to be isolated from the slurry as the slurry flows through the tank.

BACKGROUND OF THE INVENTION

Agitation tanks which contain particles and which receive a flow of a slurried pulp or slurry having metal or other values to be adsorbed on the particles have been used in the past with screen structures to keep the particles in the tanks as the slurry flows through and out of the tanks. In one particular application, namely in a carbon-in-pulp process, a slurry containing metal or other values is moved through a series of agitation tanks so that the values can be separated from the slurry by adsorption of the values by particles, such as carbon or resin particles, initially placed in the tanks. It is necessary that the particles be kept in the tanks as the slurry flows out of the tanks so that there will be continued adsorption of the values as the slurry continues to flow into and through the tanks. The carbon may be advanced from tank to tank counter-current to the flow of pulp, either on a batch or a continuous basis, with fresh carbon introduced to the last tank, and loaded carbon removed from the first tank, the loaded carbon being directed to another process step for recovering the values from the carbon.

In conventional carbon-in-pulp processing, each of a series of agitated tanks has a screen unit which allows passage of the slurry from one tank to another, yet the screen unit restricts the carbon particles with the metal and other values adsorbed thereon in one tank from passing out of the tank into another tank. Many different screen configurations have been developed and used with screen units of this type, including exterior mechanically and electrically vibrated screen units. The slurry must be delivered to these screens by pumps or similar devices. Other types of screen units include screens forming parts of the sides of overflow gravity launders.

All of these conventional screen units have disadvantages in that they either require mechanical or electrical vibrations or slurry transfer devices or they are difficult to clean and are not easily replaced. For instance, in U.S. Pat. No. 4,251,352 which describes a carbon-in-pulp process, a number of inclined screen segments are secured together at the upper end of a tank containing a slurry and carbon particles to adsorb metal and other values carried by the slurry. These screen segments frequently wear out and must be replaced. Because of their size and their locations with respect to each other in the tank, the replacement of the screens becomes a tedious job and one which requires considerable time and expense.

Because of the drawbacks of conventional agitation tanks described above, a need has arisen for improvements in such tanks to minimize the cost of making the tanks and the maintenance thereof.

SUMMARY OF THE INVENTION

The present invention satisfies the aforesaid need by providing an agitation tank having an improved screen unit therein for separating metal and other values by adsorption from a slurry flowing through the tank. Thus, the agitation tank of the present invention is especially suitable for use in carbon-in-pulp processing.

The present invention has a screen unit which can be removably mounted in an operative position near the top of an agitation tank and near a fluid outlet of the tank. The screen unit includes a hollow body having an opening across an outer peripheral portion thereof, and a screen positioned across the opening. The screen is of a mesh sufficient to allow a slurry to pass into the hollow body and then out of the tank through the fluid outlet thereof, yet carbon or other particles in the tank for use in adsorbing the metal or other values from the slurry cannot pass into the hollow body and out of the tank with the slurry. As a result, the metal or other values can by adsorption with the carbon or other particles be separated from the slurry and recovered, yet the screen unit can be quickly and easily removed from the tank and the screen of the screen unit can be replaced if the screen becomes defective.

The improved screen unit of the present invention in a preferred embodiment, has a conical, horizontal, vertically spaced annular, outer peripheral surface defining an outer peripheral, substantailly 360° opening through which the slurry passes as it moves into the hollow body. The screen of the screen unit is of a one-piece construction and is wrapped about the annular surface in surrounding relationship to such opening. Means is provided to removably secure the side margins of the screen to the screen unit so that the screen can be quickly and easily replaced after the screen unit has been lifted out of the tank, yet the screen unit can be used over and over again to minimize production and maintenance costs.

Another feature of the screen unit of the present invention is the use of an air delivery tube near the lower extremity of the screen unit to allow compressed air forced into the tube to exit therefrom through outer peripheral holes as air bubbles. The tube is located so that the air bubbles are movable along the outer surface of the screen to cause particles lodged or otherwise adjacent to the screen to be moved away from the screen. In this way, the screen is kept clear of clogging by particles so that the flow of slurry through the screen can continue uninterruptedly.

Other improvements of the screen unit of the present invention include a monitor screen which can be placed in the outlet launder of the tank to trap carbon or other particles that have passed into the hollow body becuase of a defective screen. Thus, the monitor screen acts as a detector of a defective screen of the screen unit in the tank.

A gate valve can be provided for the outlet launder of the tank. Such a valve will serve to prevent the flow of slurry out of the tank when it is desired to interrupt the slurry flow to replace the screen unit thereof.

The primary object of the present invention is to provide an agitation tank of the type described in which the tank has a smaller, improved screen unit removably mounted in the tank and the screen unit can be quickly and easily replaced if the screen thereof has become defective, all for the purpose of minimizing the time during which the operation of the tank is interrupted. Thus, the tank is especially suitable for use in a carbon-in-pulp process for the recovery of metals or other values from a slurry.

Another object of the present invention is to provide an improved agitation tank of the type described wherein the screen unit has a lower, perforated tube which permits rising air bubbles to be formed and to rise past the outer surface of the screen of the screen unit to keep particles out of the screen so as to keep the screen clear and to permit uninterrupted flow of slurry through the screen.

Other objects of this invention will become apparent as the following specification progresses, reference being had to the accompanying drawings for an illustration of the invention.

IN THE DRAWINGS

Figure 6:
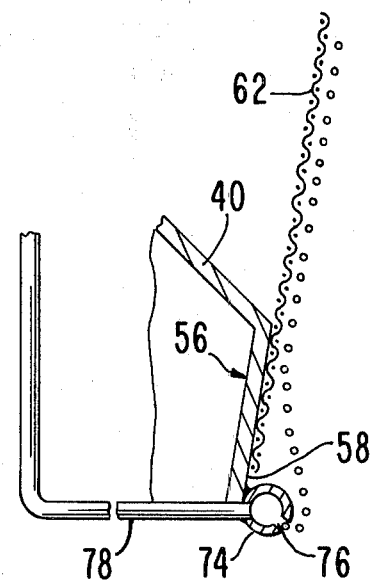
Figure 5:
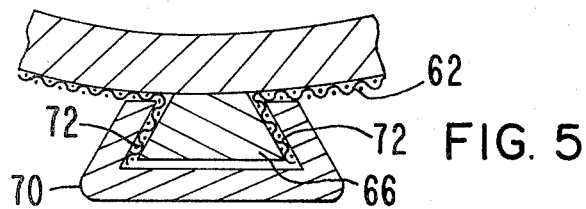

FIG. 5 is an enlarged, fragmentary, cross-sectional view of a screen unit showing the way in which the ends of a screen of the screen unit are removably secured to a framework for mounting the screen in place on the screen unit; and FIG. 6 is an enlarged, fragmentary, cross-sectional view of a screen unit, showing the way in which air bubbles are generated near the lower end of the screen of the screen unit for keeping the openings of the screen clear of particles.

Figure 1:
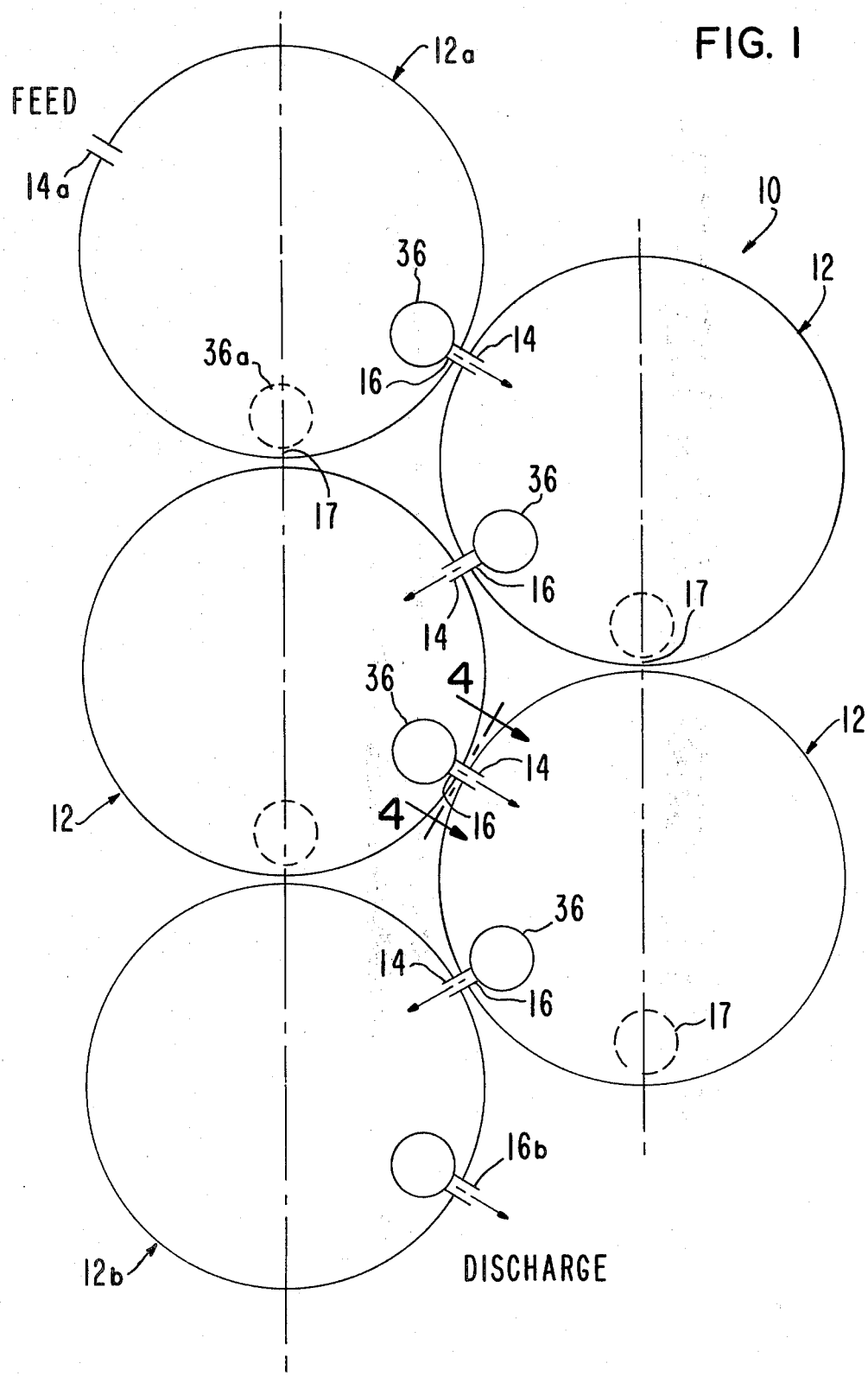
FIG. 1 is a top plan view of a number of tanks arranged in a cluster for receiving a slurry for use in a carbon-in-pulp process for recovery of metal or other values from the slurry.

A system for carbon-in-pulp processing according to the present invention is shown in FIG. 1 and is broadly denoted by the numeral 10. System 10 includes a number of open top tanks 12 which are arranged in any suitable manner, such as in the cluster shown in FIG. 1, so that each pair of adjacent tanks can be put in fluid communication with each other. One of the tanks, namely tank 12a, is considered the most upstream tank and has a stub launder 14a defining a fluid inlet for the system for receiving a slurry containing metal or other values to be recovered from the slurry by adsorption with carbon or other particles 15 (FIG. 3) in the tank. Another tank, namely tank 12b, considered the most downstream tank, has a stub launder 16b defining a fluid discharge outlet for the system to permit removal of the slurry after the values have been removed therefrom by adsorption. The remaining, intermediate tanks 12 are coupled in series with the upstream and downstream tanks 12a and 12b as shown in FIG. 1, each tank having a connecting stub launder 16 connecting it with an adjacent tank.

The movement of the slurry through system 10 is by gravity flow because tanks 12, from the upstream tank 12a to the downstream tank 12b, are at progressively lower levels with respect to each other. The gravity flow eliminates the need for pumps and other equipment for causing fluid transfer from one tank to the next. The tanks are interchangeable as to their positions in the cluster shown in FIG. 1. Also, there can be a greater or fewer number of tanks in the cluster, if desired. Further, one or more of the tanks of the cluster can be bypassed by using connecting stub launders at alternate locations, such as locations 17 (FIG. 1).

Figure 3:
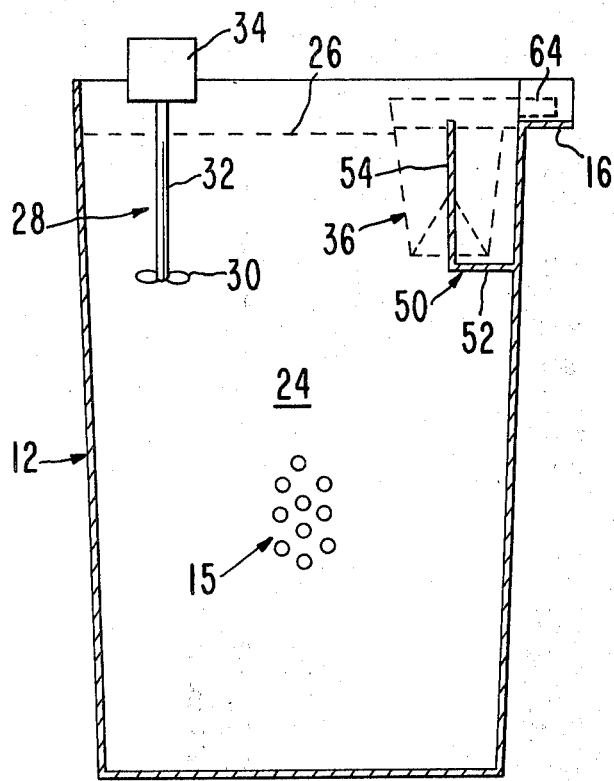
FIG. 3 is a vertical section of one of the tanks in FIG. 1, showing the way in which the screen unit thereof is removably coupled to the tank.
Figure 4:
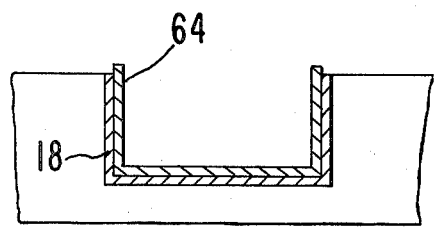
FIG. 4 is an enlarged, cross-sectional view taken along line 4—4 of FIG. 1.

Each tank 12 contains a mass of carbon or other particles 15 as shown in FIG. 3. The particles are initially in the tanks before the slurry 24 is introduced, the pulp being typically at a level 26 (FIG. 3) in each tank 12. The particles in each tank have a predetermined minimum size so that they will not pass through a screen hereinafter described yet the slurry in the tank can pass through such screen. Thus, the particles are kept in the tank while the slurry can pass through and out of the tank after passing through such screen as will hereafter be described.

Agitation means 28, as shown in FIG. 3, typically is provided in each tank to cause the particles 15 therein to be moved about in the tank to prevent settling and to increase the rate of adsorption of the values by the particles. For purposes of illustration, the agitating means includes a propeller 30 (FIG. 3) coupled to the shaft 32 of a drive motor 34 coupled with each tank in any suitable manner.

Figure 2:
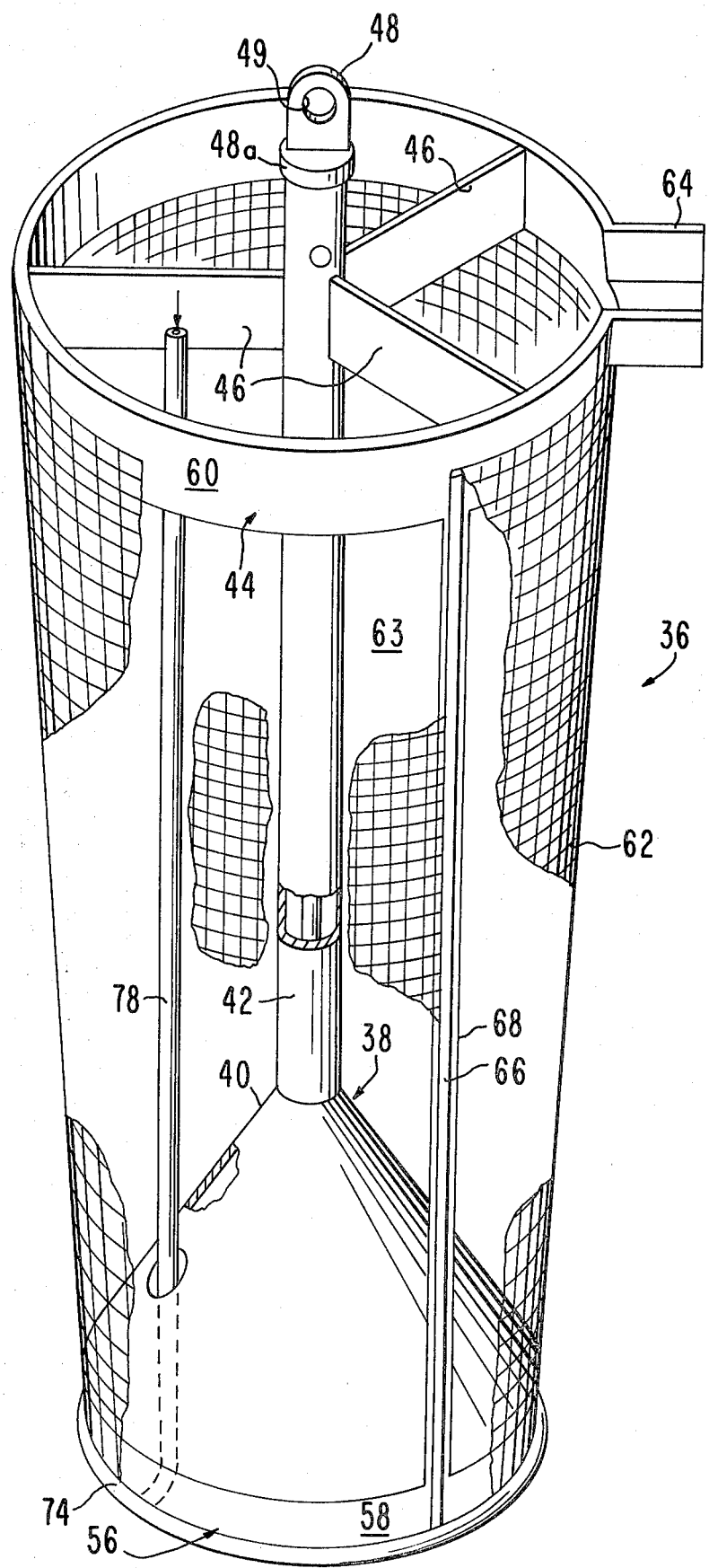
FIG. 2 is a perspective view of a screen unit for use in each of the tanks, respectively, of FIG. 1.

As shown in FIG. 3, each tank 12 has a conical screen unit 36 removably mounted therein to keep the particles 15 in the tank yet allow passage of the slurry 24 out of the tank. Each screen unit 36 as shown in FIG. 2 includes a hollow body 38 provided with a hollow, conical base 40 and an upright tube 42 secured to and extending upwardly from the upper end of base 40. A rigid ring member 44 is secured by rigid, radial legs 46 to tube 42 near the upper end thereof so that member 44 surrounds tube 42 and is spaced outwardly therefrom. A lifting cap 48 having a hole 49 is on the upper end of tube 42 and is adapted to receive a hook (not shown) or other structure of a hoist for raising and lowering the screen unit 36 with reference to the tank in which it is used.

As shown in FIG. 3, tank 12 has a mounting rod 50 to removably support a respective screen unit 36 in an operative position adjacent to the connecting stub launder 16 of the tank. Rod 50 is secured to tank 12 in any suitable manner. For purposes of illustration, rod 50 is L-shaped and has a horizontal segment 52 secured by welding or other means to the inner surface of the side of the tank, and a vertical segment 54 secured to and extending upwardly from the inner end of segment 52. Segment 54 is adapted to be inserted into base 40 and tube 42 of screen unit 36 as the screen unit is lowered into the tank and into its operative position shown in dashed lines in FIG. 3. Base 40 is conical in shape to serve as a guide for facilitating the insertion of segment 54 into tube 42. When properly installed on mounting rod 50, screen unit 36 is supported by causing the upper end of segment 52 to engage the bottom 48a of lifting cap 48. If rod 50 were to extend to the bottom of the tank, the rod would have a suitable stop on it intermediate its ends to limit downward movement of screen unit 36 along the rod.

Figure 4A:
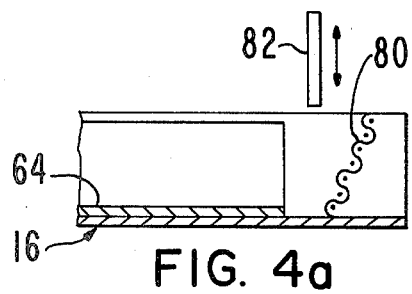
FIG. 4a is an enlarged cross-sectional view of the stub launder of one of the tanks showing a monitor screen and a fluid shut-off gate for the stub launder.

Base 40 has an annular skirt 56 provided with a beveled outer surface 58 as shown in FIGS. 2 and 6. Also, ring member 44 has a beveled, generally flat outer surface 60 vertically spaced from surface 58 of skirt 56. Surfaces 58 and 60 are extensions or segments of a conical surface and provide annular backing supports for the lower and upper margins of a screen 62 which is wrapped about base 40 and ring member 44 and all the space therebetween as shown in FIG. 2. The screen surrounds the interior space of screen unit 36 and operates to prevent particles 15 from passing from the main part of tank 12 into this interior space 63 (FIG. 2) of hollow body 38, yet allows the slurry to pass readily into such interior space 63 and then out of the space through a stub launder 64 (FIG. 2) secured to member 44 and extending laterally therefrom. Stub launder 64 of each screen unit 36 is removably and telescopically received within the adjacent connecting stub launder 16 of the tank 12 in which the screen unit 36 is mounted as shown in FIG. 4a when the screen unit is in its operative position shown in FIG. 3. Stub launders 16 and 64 are in substantially sealing relationship with each other to prevent leakage at the junction therebetween as the slurry is transferred out of the tank. It may be desirable to use a suitable plastic or rubber seal to seal this junction.

Screen 62 (FIG. 2) is removably mounted on the framework of screen unit 36 in any suitable manner to permit quick replacement of the screen when it becomes defective or wears out. For purposes of illustration, a fixed bar 66 is secured to and extends between base 40 and member 44 as shown in FIGS. 2 and 5. A rigid backing strip 68 (FIG. 2) is also secured to base 40 and member 44 to provide a backing support for bar 66.

Bar 66 is trapezoidal in cross-section as shown in FIG. 5 to present a pair of opposed, generally flat side surfaces which converge as the radially inner extremity of the bar is approached. The bar is typically tapered from the lower end to the upper end thereof. For instance, the maximum transverse dimension of bar 66 at the lower end is 1¾-inch and the maximum transverse dimension at the upper end is 1-inch. A clamp member 70 (FIG. 5) is adapted to fit and slide over bar 66 when the ends 72 of screen 62 are alongside the flat side surfaces of bar 66 as shown in FIG. 5. Clamp member 70 thus removably secures the ends 72 of screen 62 to bar 66.

When clamp member 70 is moved into place, it not only clamps sides 72 of screen 62 to bar 66 but it also holds the screen, when properly mounted, in a taut condition surrounding frame 38 of screen unit 36. The screen is replaceable by removing clamp member 70 from bar 66, whereupon the screen is removed from body 38 and a new screen is put into place on body 38 and releasably secured thereto by clamp member 70 in the manner shown in FIG. 5.

Base 40 has an annular air delivery tube 74 secured thereto near its lower extremity as shown in FIGS. 2 and 6. Tube 74 surrounds skirt 56 at the lower end of base 40 and has a plurality of air discharge holes 76 (FIG. 6) therethrough. An air delivery pipe 78 extends downwardly through the interior of screen unit 36 and is in fluid communication with tube 74. Pipe 78 is adapted to be coupled to a source of compressed air (not shown). When the air source is actuated, compressed air from the source is forced into tube 74 and then out of the tube through openings 76 thereof. The openings are at suitable locations on tube 74, such as on the outer portion of tube 74 remote from skirts 56 of base 40. Air emitted through openings 76 travel upwardly and along the surface of screen 62 as bubbles as shown in FIG. 6. These air bubbles assist in keeping the screen openings clear of particles 15 which would otherwise tend to block the screen and prevent the slurry from passing into the interior of screen unit 36 through screen 62. Also, the bubbles force any particles 15 away from the screen and back into the main part of the tank.

Another feature of the present invention is the use of an inclined monitor screen 80 (FIG. 6) in each connecting stub launder 16. Screen 80 allows the slurry to pass through it but is of such a mesh to trap particles 15 from leaving the tank. Screen 80 also is useful as an indicator to signal the failure of screen 62. Screen failure occurs when the screen has a hole in it that is large enough to allow particles 15 to flow into the interior space 63 of the screen unit and out of the screen unit through stub launder 64 thereof. This screen failure is detected by observing particles 15 caught in screen 80. When such particles are detected, flow is interrupted and the defective screen unit 36 is removed and repaired or replaced.

Each connecting stub launder 16 may be equipped with a sliding gate 82 (FIG. 4a) to prevent the flow of slurry out of the tank, such as during the time when a screen unit is to be repaired or replaced. Means (not shown) is provided for mounting the gate for up and down movement on the connecting stub launder 16.

It is generally convenient for most plants to have a lifting device, such as a monorail or a hoist, to service each of tanks 12. Such a lifting device can be used to install and remove screen units 36.

In operation, assuming the system 10 has the clustered tanks 12 as shown in FIG. 1, screen units 36 are installed in the tanks in their operative positions in which each screen unit projects above the normal level 26 of the slurry in the tank in which it is located. Then, a slurry is directed into the inlet stub launder 14a of the upstream tank 12a and caused to move through the tanks to the outlet stub launder 16b of the downstream tank 12b. The tanks will have been provided with particles 15 before the slurry is introduced into the tanks so that the metal or other values in the slurry can be removed from the slurry by adsorption by the particles 15.

The slurry is agitated during flow through the tanks, such as by agitating means 28 in each tank as shown in FIG. 3. The volume rate flow of slurry into the upstream tank 12a will determine the flow through the various tanks and out of the downstream tank 12b. Also, the size of each screen unit 36 will be determined by the volume rate of flow of slurry through the tanks.

What is claimed is:

1. Apparatus for use in separating metal and other values from a slurry by adsorption with particles comprising: a tank for holding a slurry containing the values to be separated and a number of particles on which the values are to be absorbed, said tank having an outlet stub launder; a screen unit for the tank, said screen unit including a hollow body provided with an outer side opening and a screen across the side opening to permit slurry flow into the interior of the body; and means on the tank for removably mounting the screen unit in the tank in an operative position near the outlet stub launder thereof, said screen unit having a stub launder removably receivable in the outlet stub launder of the tank when the screen unit is in said operative position, said outlet stub launder being adapted for directing the slurry out of the tank after the slurry has passed through the screen unit, the screen of the screen unit being of a mesh sufficient to permit the slurry to pass from the tank into the screen unit and to prevent particles in the tank from entering the screen unit.

2. Apparatus as set forth in claim 1, wherein the mounting means for said tank comprises a post, and means mounting the post in the tank in a position near the outlet stub launder of the tank, said screen unit having means for removably receiving the post.

3. Apparatus as set forth in claim 2, wherein the post comprises an L-shaped member having a pair of elongated segments, one of the segments being upright and defining the post, the lower end of said one segment being secured to one end of the other segment, the opposite end of the other segment extending to the side of the tank.

4. Apparatus as set forth in claim 2, wherein the body of the screen unit has a passage therein, the passage having an open bottom, the screen unit being movable onto the post, said post being inserted into the passage when the screen unit is moved into said operative position in the tank.

5. Apparatus as set forth in claim 1, wherein the stub launder of the screen unit is complementally receivable in the outlet stub launder of the tank when the screen unit is in said operative position thereof.

6. Apparatus as set forth in claim 1, wherein the body of the screen unit has an outer periphery, said screen being removably mounted on the body at the outer periphery thereof.

7. Apparatus as set forth in claim 6, wherein the body has an upper, annular surface and a lower, annular surface spaced from the upper surface, the opening being between the upper and lower surfaces, the screen having upper and lower margins overlapping the upper and lower surfaces, respectively, and means carried by the body for releasably securing the side margins of the screen to the body.

8. Apparatus as set forth in claim 7, wherein said securing means comprises a bar secured to the body and spanning the distance between said upper and lower surfaces, the bar having a pair of opposed sides, and means removably coupled with the bar for clamping the side margins of the screen to the sides of the bar.

9. Apparatus as set forth in claim 8, wherein the bar has a pair of convergent, flat sides, said attaching means comprising a clamp member having a channel for complementally receiving the bar when the side margins of the screen are adjacent to the sides of the bar.

10. Apparatus as set forth in claim 1, wherein is included means defining a fluid passage adjacent to the lowermost extremity of the screen of each screen unit, respectively, said passage defining means having a number of fluid outlet openings to allow a fluid under pressure to pass out of the fluid passage and upwardly past the screen of the screen unit to cause particles in or near the screen to be moved away from the screen.

11. Apparatus as set forth in claim 10, wherein the body of the screen unit has an annular, lower marginal edge, said passage defining means comprising a tube secured to and extending about the outer periphery of said lower marginal edge, said tube having a number of holes therethrough in the outer periphery thereof.

12. Apparatus as set forth in claim 1, wherein the screen unit has a pair of vertically spaced, generally annular, outer surfaces, said outer opening of the body being between said surfaces, said screen extending about the body and having upper and lower margins removably engaging said annular, outer surfaces, respectively, and means carried by the body for releasably securing the side margins of the screen thereto.

13. Apparatus as set forth in claim 1, wherein is included a monitor screen across the outlet launder to trap particles flowing through the outlet stub launder.

14. Apparatus as set forth in claim 1, wherein is included a valve removably on the outlet stub launder to control the slurry flow through the outlet stub launder.

* * * * *